United States Patent [19]

Kassai

[11] 4,152,010
[45] May 1, 1979

[54] FOLDING BABY CARRIAGE

[75] Inventor: Kenzou Kassai, Higashihimizu, Japan

[73] Assignee: Kassai Kabushiki Kaisha, Osaka, Japan

[21] Appl. No.: 733,904

[22] Filed: Oct. 19, 1976

[30] Foreign Application Priority Data

Aug. 19, 1976 [JP] Japan .......................... 51-111371[U]

[51] Int. Cl.² .............................................. B62B 7/06
[52] U.S. Cl. .................................................. 280/650
[58] Field of Search ................ 280/650, 642, 644, 647

[56] References Cited

U.S. PATENT DOCUMENTS 2,689,135  9/1954  Toohey .................................. 280/644
3,936,069  2/1976  Giordani ............................... 280/650

Primary Examiner—Johnny D. Cherry
Attorney, Agent, or Firm—Browdy and Neimark

[57] ABSTRACT

The present invention relates to a folding baby carriage which can be opened or folded using one hand. The folding baby carriage is provided with a structural member constituted by a backrest part with a grip on the back surface thereof and a leg fitting part, a main rod slidably provided on the back surface of the structural member, front and rear legs pivotally mounted on the leg fitting part, and connecting rods which connect the front and rear legs with the bottom of the main rod. The carriage may be opened or folded by sliding the main rod. The improvement includes a footboard provided at the bottom of the main rod. The footboard extends in the direction nearly perpendicular to the main rod. The carriage can be folded simply by pulling up the structural member having the grip using one hand with one's placed foot on the footboard. The carriage can be opened by pushing down the structural member having the grip using one hand while supporting the lower surface of the footboard by the instep of one's foot.

4 Claims, 5 Drawing Figures

FOLDING BABY CARRIAGE

BACKGROUND OF THE INVENTION

The present invention relates to the improvement in a folding baby carriage which can be opened and folded with one hand.

There have been various kinds of folding baby carriages which have different opening and folding systems, but they are generally complicated in operation. The opening and folding operation is best desired to be carried out with one hand, holding a baby in other arm in a standing posture. Such a folding baby carriage is particularly convenient when riding on traffic facilities.

It is an object of the present invention to provide a folding baby carriage which can be opened and folded by a person with one hand in a standing posture.

BRIEF DESCRIPTION OF THE DRAWING

The foregoing object and advantages will appear more fully from the following description referring to the accompanying drawings, wherein.

DETAILED DESCRIPTION OF THE PREFERRED EMBODIMENTS

Figure 1:
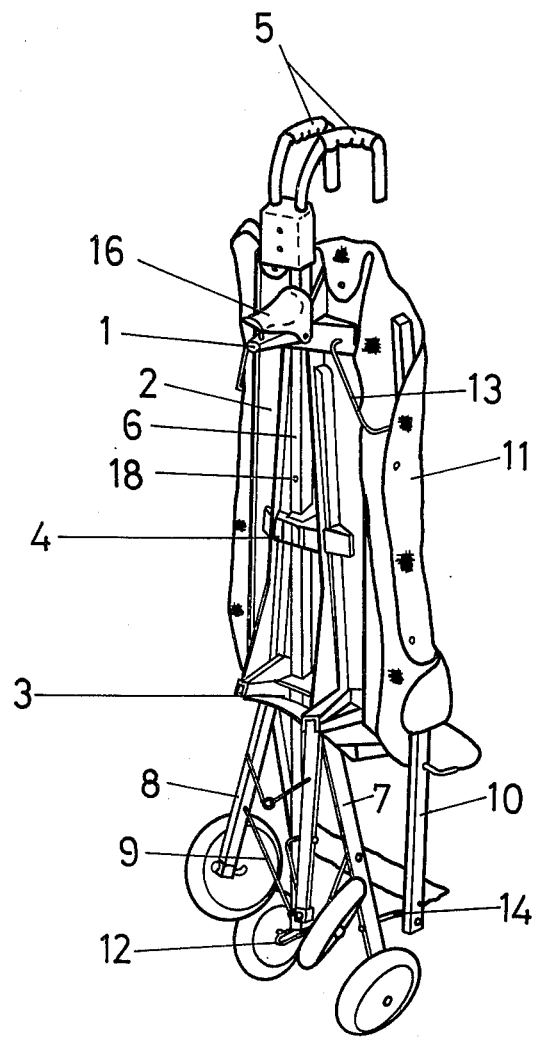
FIG. 1 is a perspective view showing a folding baby carriage in a folded state, the carriage being constructed according to the present invention.
Figure 2:
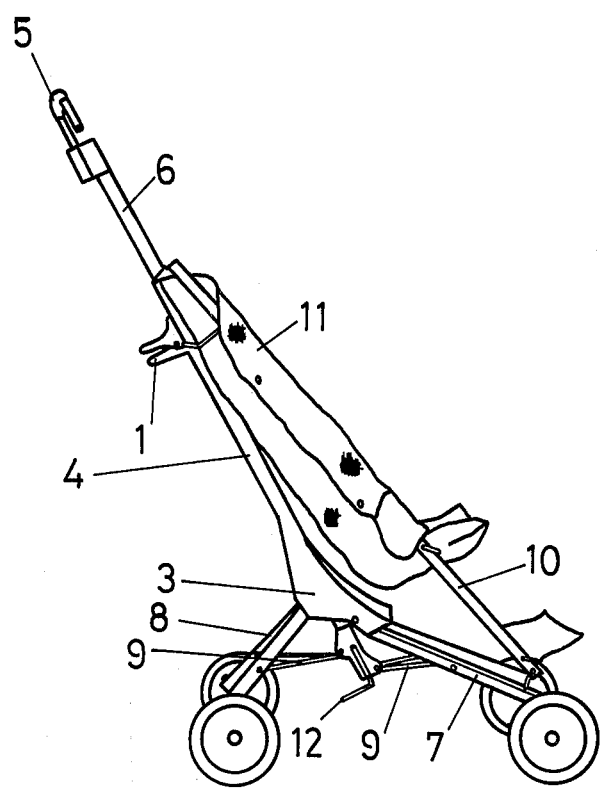
FIG. 2 is a side view showing the folding baby carriage of FIG. 1 in a folded state.

The folding baby carriage of an exemplary embodiment of the present invention as shown in the drawings is provided with a structural member 4 which consists of a flat backrest part 2 having a grip 1 at the upper portion of the back surface thereof and a leg fitting part 3 extending from the lower end of the backrest part 2. The backrest part 2 and the leg fitting part 3 are integrally molded of synthetic resin. The carriage is also provided with a main rod 6 which, having a handle at the top thereof, is provided on the back surface of the backrest part 2 slidably with the structural member 4. Front and rear legs 7,7, 8,8 are pivotally mounted on the leg fitting part 3. The front and rear legs 7,7,8,8 are connected with the bottom of a main rod 6 by connecting rods 9, 9, 9, 9 so that the front and rear legs 7,7,8,8, can be opened or folded by sliding of the main rod 6 with respect to the structural member 4. The lower ends of side rods 10, 10 are connected to the front legs 7,7 by connecting rods 14 and the upper ends of the side rods 10,10 are connected to the back surface of the backrest part 2 by connecting rods 13. A hammock 11 is coupled to the front surface of the backrest part 2, both sides of the hammock 11 being wound around the respective rods 10. A stopper 16 with a projection 15 is pivotally provided to the grip 1 by a shaft 21. A projection 15 engages in apertures 17,18 which are provided at a suitable distance on the back surface of the main rod 6, thereby maintaining respectively a folded or opened state of the baby carriage.

The stopper 16 is biased upwardly by a spring 19 so that the projection 15 may engage in the apertures 17,18. Numeral 20 indicates a fitting element which is provided at the bottom of the main rod 6. The ends of the connecting rods 9,9,9,9 are rotatably connected to the fitting element 20.

The opening and folding operation of the folding baby carriage described above could be conventionally executed by sliding the main rod 6 relative to the structural member 4, holding the handle 5 by one hand and releasing the engagement of the projection 15 from the aperture 17 with the grip 1 and the stopper 16 in another hand.

Figure 3:
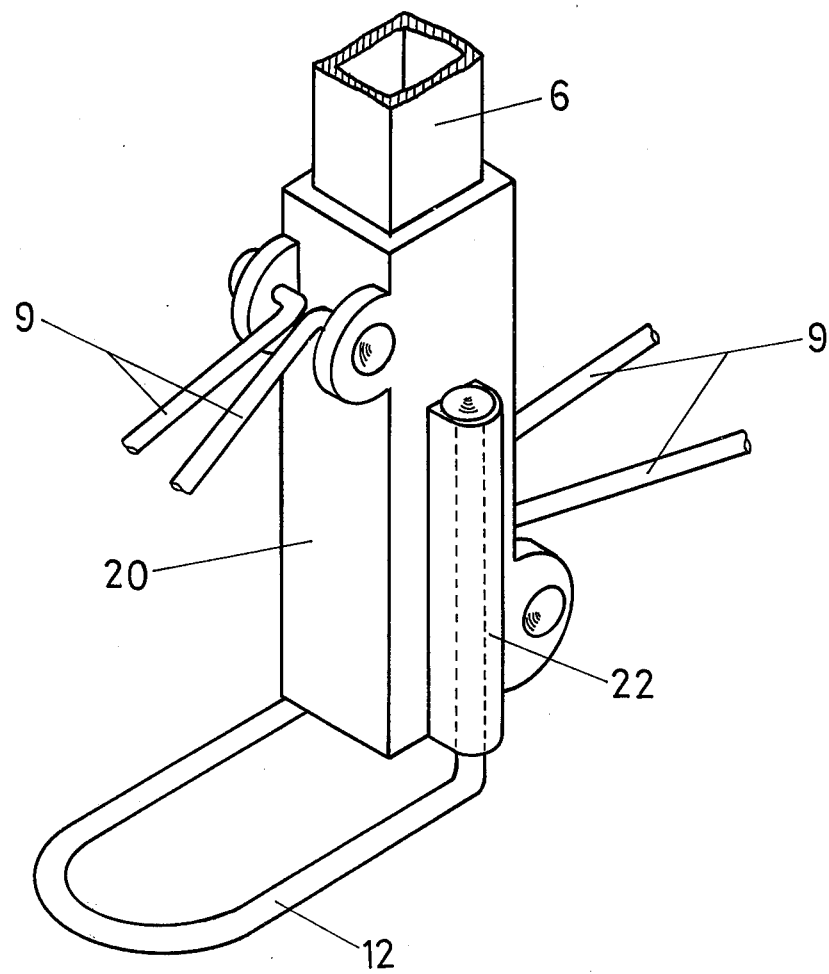
FIG. 3 and FIG. 4 are respectively enlarged perspective views of two embodiments of a footboard with a part of the carriage and which can be used in the carriage of FIGS. 1 and 2.

One embodiment of the folding baby carriage of the present invention has a footboard 12 (FIG. 3) which is provided at the bottom of the main rod 6 and extends in the direction perpendicular to the main rod 6. By virtue of this construction, the carriage can be folded from its opened state by a standing person by pulling up the structural member 4 using the grip 1 and the stopper 16 in only one hand, releasing the engagement of the projection 15 from the aperture 17, while putting a foot on the footboard 12. The carriage can also be opened from its self-standing folded state by a standing person by pushing down the structural member 4 using the grip 1 in only one hand, while supporting the lower surface of the footboard 12 by the instep of a foot.

In this embodiment, the footboard is made of a U-shaped rod which is bent in nearly right angles at the middle portion; both ends of the footboard 12 are inserted into fitting holes 22,22 provided on both sides of the fitting element 20.

Figure 4:
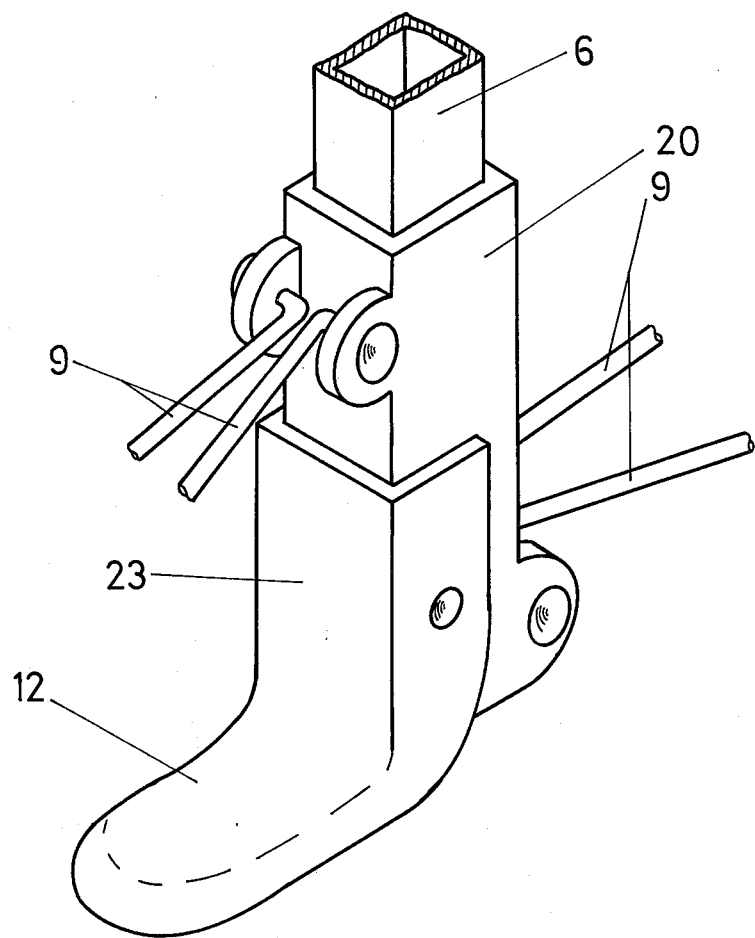
Figure 5:
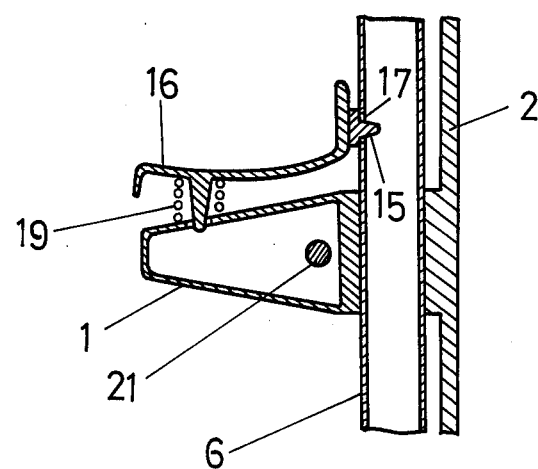
FIG. 5 is a cross-sectional view of a stopper useable in practicing the invention.

In a second illustrated embodiment of the present invention as shown partially in FIG. 4, a footboard 12 is made of a tongue-shaped plate, and is integrally formed with a fitting part 23 which has a U-shaped section, whereby the footboard 12 is fitted to the fitting element 20.

In the second embodiment of the present invention, the footboard 12 is made of synthetic resin, which is integrally molded with the fitting element 20.

As described above, the folding baby carriage of the present invention is very convenient because it can be opened or folded by a standing person, using only one hand with a baby in another hand when getting on or off other transportation facilities.

It is to be understood that the foregoing text and accompanying drawings have been set out by way of example, not by way of limitation. Other embodiments and varients are possible within the spirit and scope of the invention, its scope being defined by the appended claims.

As above-mentioned, the footboard of the present invention is simple in structure, and can easily be fitted on conventional baby carriages, whereby opening and folding operation of baby carriages with one hand becomes possible.

What is claimed is:

1. In a folding baby carriage including:
   a structural member which has a backrest part having a grip at the upper portion of a back surface thereof and a leg fitting part extending from a lower end of said backrest part;
   a main rod having a bottom portion, a top and a handle at said top thereof, said main rod being provided on a back surface of said backrest part slidable with said structural member;
   front and rear legs pivotally mounted on said leg fitting part;
   connecting rods which connect said front and rear legs with the bottom portion of said main rod at points thereon, said front and rear legs being folded and opened by sliding of said main rod;

side rods having lower ends connected to said front legs and upper ends connected to said back surface of said backrest part;

a hammock on a front of said backrest part, respective sides of said hammock being wound around respective side rods;

the improvement comprising:

a footboard provided on said bottom portion of said main rod at a position spaced from and beneath said points to which said connecting rods are connected, said footboard extending in a direction substantially perpendicular to said main rod; whereby the folding operation of the carriage may be executed by a standing person by pulling up the structural member with the grip in one hand, while putting a foot on a footboard and the opening operation may be executed by a standing person by pushing down the structural member with the grip in one hand, while supporting the lower surface of the footboard by the instep of the person's foot.

2. A folding baby carriage according to claim 1, wherein said footboard is made in the form of a rod.

3. A folding baby carriage according to claim 1, wherein said footboard is made in the form of a plate.

4. A folding baby carriage according to claim 1, wherein said footboard is made of synthetic resin.

* * * * *